Figure 1:
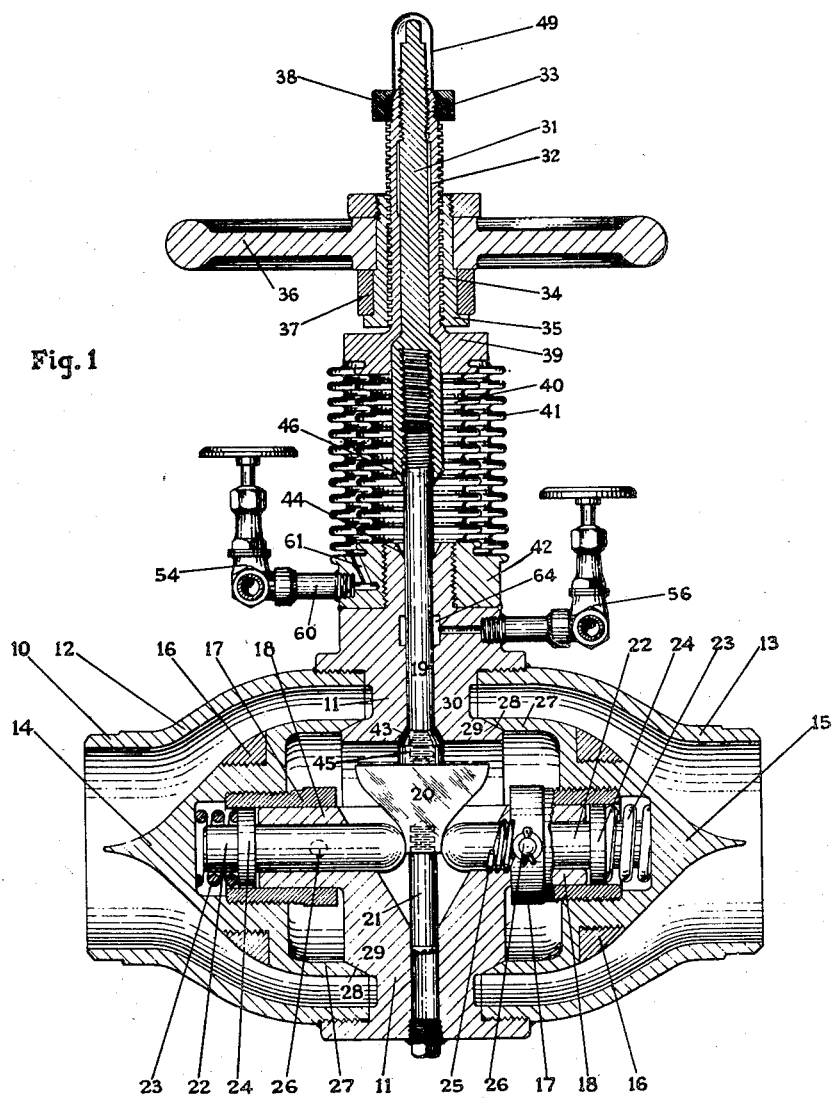

Jan. 17, 1950

J. B. THOMAS 2,495,081

PACKLESS VALVE

Filed Feb. 19, 1944

3 Sheets-Sheet 1

Jesse B. Thomas INVENTOR.

BY

Jan. 17, 1950  J. B. THOMAS  2,495,081
PACKLESS VALVE
Filed Feb. 19, 1944  3 Sheets-Sheet 2

Jesse B. Thomas INVENTOR.

BY
Robert A. Lavender

Jan. 17, 1950

J. B. THOMAS 2,495,081

PACKLESS VALVE

Filed Feb. 19, 1944

3 Sheets-Sheet 3

Jesse B. Thomas INVENTOR.

BY

Robert A. Lavender

Patented Jan. 17, 1950

2,495,081

UNITED STATES PATENT OFFICE 2,495,081

PACKLESS VALVE

Jesse B. Thomas, Jackson Heights, N. Y., assignor, by mesne assignments, to the United States of America as represented by the United States Atomic Energy Commission Application February 19, 1944, Serial No. 523,142

5 Claims. (Cl. 277—33)

This invention relates to improvements in valves for controlling the flow of fluids, and particularly to a packless, double-seated valve for pipe lines conducting gases or liquids.

The double valve disclosed herein includes a valve casing having a streamline interior passage and a mechanically expanded double valve head structure within the passage. The valve head is manually operable to close the passage at two points to prevent the leakage of fluids through or into the valve. An arrangement of sealing fluids under pressure and of bellows type seals provides a leakproof packless structure particularly suitable for controlling the flow of valuable gases and/or liquids of a corrosive nature.

It is the object of this invention to provide a valve construction having a substantially streamline interior permitting an unobstructed flow of fluids therethrough when the valve is in the open position.

It is another object of the invention to provide a double-heated valve construction in which a double valve head cooperates with valve seats at opposite ends of the valve to positively stop the flow or leakage of fluids through or into the valve in either direction.

It is another object of the invention to provide a double-seated valve construction which does not require the use of packing material and which is therefore suitable for controlling the flow of fluids of a corrosive or chemically active nature.

A further object of the invention is to provide a packless, double-seated valve utilizing a sealing fluid under pressure to prevent leakage.

A further object of the invention is to provide a packless valve having a plurality of fluid seals including means permitting a determination of whether or not leakage occurs within the valve.

A further object of the invention is the provision of a packless valve having internal sealing devices that may be used in an emergency while renewing the main sealing mechanism.

A still further object of the invention is the provision of a packless valve utilizing fluid seals arranged so that the sealing fluids may be withdrawn from the interior of the valve when the valve is in the open position in order not to contaminate valuable fluids whose flow is controlled by the valve.

Other objects and advantages of the invention will be readily apparent from the following description and the accompanying drawings illustrating a preferred embodiment of the invention.

Figure 2:
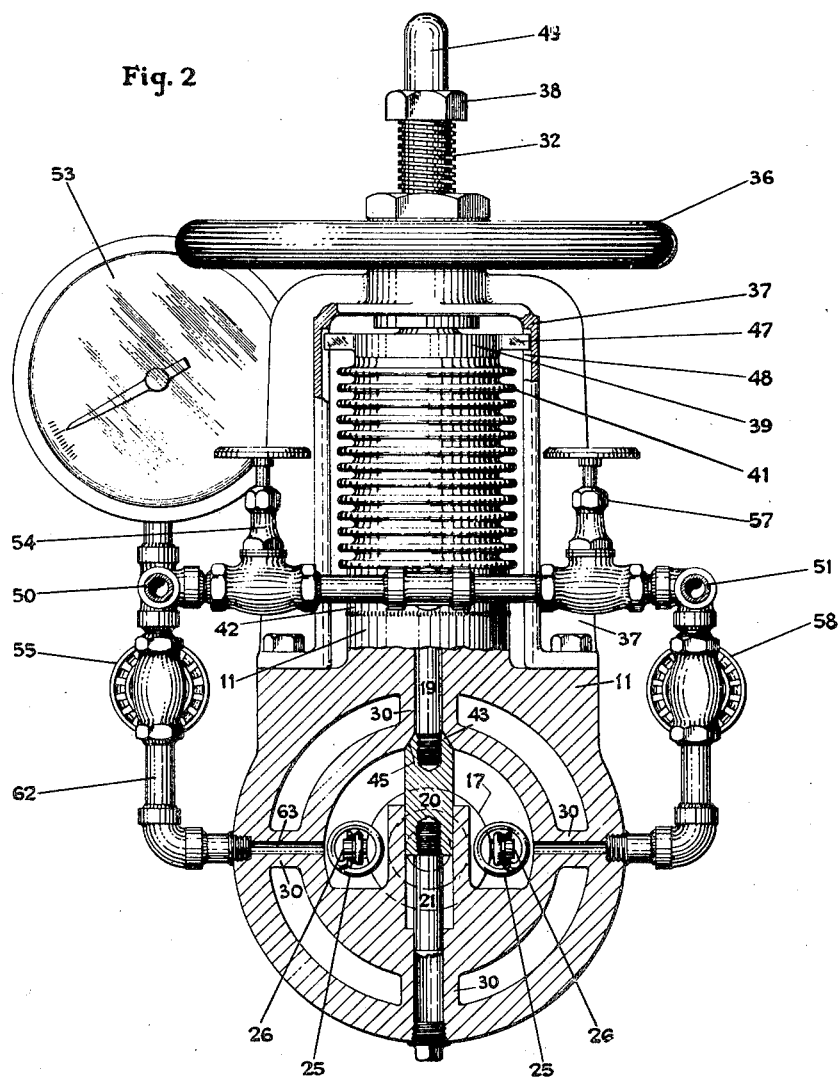
Figure 3:
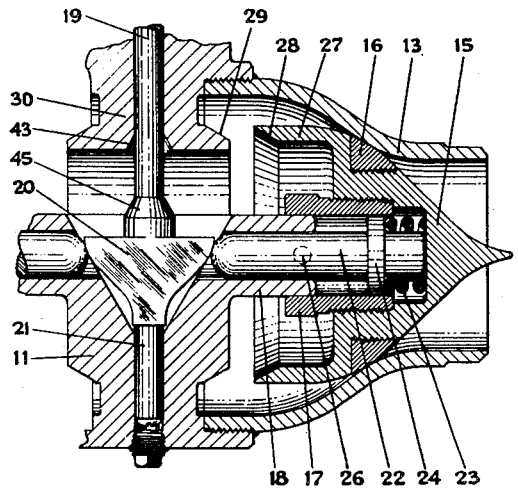
Figure 4:
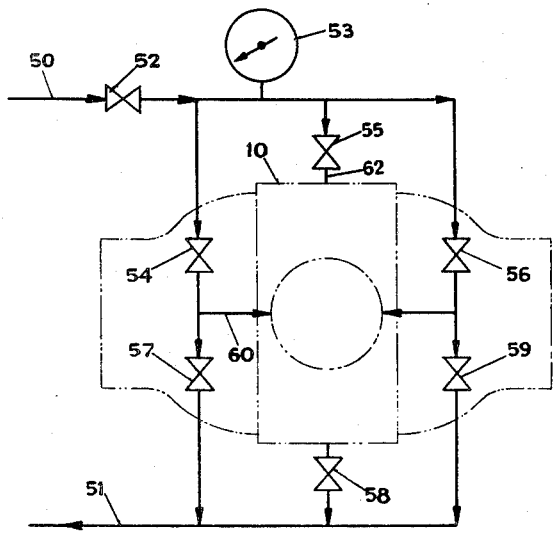

Referring to the drawings, Fig. 1 is a longitudinal elevational view partly in section, showing a valve in the valve open position. Fig. 2 is an elevational view partly in section at right angles to the view of Fig. 1. Fig. 3 is an elevational view partly in section of a portion of the valves of Figs. 1 and 2, and shows a valve in the closed position. Fig. 4 is a diagrammatic plan view showing the arrangement of the sealing fluid system and control valves therefore used with the packless, double-seated valve illustrated in the preceding figures.

The valve casing 10 includes a central member 11 and coupling sleeves 12 and 13 secured thereto by threaded joints or welding. The sleeves 12 and 13 are preferably in axial alignment and adapted to be connected to conventional pipes or conduits. It is immaterial which sleeve is used as the valve inlet or valve outlet, as the construction illustrated is suitable for controlling the flow of fluids in either direction. A pair of valve heads 14 and 15 are positioned within the valve casing 10 and are supported for movement axially to engage the restricted portion of sleeves 12 and 13, respectively, being seated thereagainst when it is desired to close the passage through the valve. The outer surfaces of the valve heads 14 and 15, exposed to the fluids whose flow is controlled, are of streamline shape, and each may be provided with a ring 16 of suitable seating material.

The valves 14 and 15 are supported by bushings 17 engaging guide sleeves 18, the latter projecting from the body member 11. A valve stem 19 extends into the member 11 and carries a valve-actuating cam 20 and a stem guide 21. Plungers 22 extend between the cam 20 and the valve heads 14 and 15. Pressure equalizing springs 23 or spring washers may be used between the valve heads 14 and 15 and collars 24 on the plungers 22. Tension springs 25 extending between bosses 26 on the bushings 17 are provided to bias the valve heads 14 and 15 toward each other to the valve open position shown in Fig. 1. Each valve head is provided with a skirt 27 having a face 28 shaped to cooperate with annular seats 29 on the member 11 when the heads are in the valve open position Fig. 1. In this position the heads 14 and 15 together with member 11 provide a body of substantially streamline configuration evenly spaced from the inner surface of the valve casing 10 by arms 30 so as to cause minimum obstruction to the flow of fluids through the valve in either direction. The spacing arms 30 of member 11 may also be of streamline shape in cross section.

The valve stem 19 is provided with a spindle 31 at its upper end. A threaded sleeve 32 surrounds the spindle 31 and is adjustable therealong by means of a threaded connection 33. An outer thread 34 on sleeve 32 is engaged by a sleeve 35 carried by a hand wheel 36. The hand wheel 36 is supported by a yoke 37 rigidly secured to and extending upward from the member 11. A cap 49 of copper or the like is secured to the upper end of sleeve 32 by a compression-type coupling 38 to cover and seal the upper end of spindle 31. The lower end of sleeve 32 is provided with an integral collar 39 to which a concentric pair of bellows type seals 40 and 41 are secured at their upper ends, these seals being secured at their lower ends to a collar 42 carried by the upper portion of member 11. The "Sylphon" type bellows 40 and 41 are fastened to the upper and lower collars by brazing or soldering, and the collar 42 should be welded to member 11 to provide a leak-proof joint. The collar 39 is provided with projections 47 engaging slots 48 in the yoke 37 to prevent the sleeve 32 from turning and the bellows 40 and 41 from twisting. The upper portion of member 11 is provided with vertically spaced tapered seats 43 and 44 through which the valve stem 19 extends. The upper edge of cam 20 is provided with an interiorly threaded tapered projection 45 complementary in shape to the tapered seat 43 to cooperate with and engage the seat 43 when the stem 19 and cam 20 are in the extreme open valve position. The tapered lower end 46 of spindle 31 is shaped to cooperate with and engage the seat 44 when the stem 19 is in the down or closed valve position or when the spindle 31 is turned down on the stem 19. The threaded connection of the spindle 31 to the valve stem 19 provides means for relative adjustment to obtain proper seating of the end 46 of the spindle against the seat 44.

Referring to the system of sealing gas connections shown diagrammatically in Fig. 4, an inlet for a supply of sealing gas under pressure is indicated by the numeral 50, and a sealing gas evacuating header indicated by the numeral 51. The sealing gas system includes an inlet valve 52, a pressure gauge 53, and control valves 54, 55, 56, 57, 58, and 59. Valve 54 controls the inlet of sealing gas through nipple 60 and passage 61 to the space between the bellows 40 and 41. Valve 57 controls the evacuation of gas from the space between said bellows to the evacuating header 51. Valve 55 controls the inlet of sealing gas through nipple 62 and passage 63 to the interior chamber of member 11 between the valve heads 14 and 15. Valve 58 controls the evacuation of gas from said interior chamber of member 11 to the header 51. Valve 56 controls the inlet of sealing gas to an annular chamber 64 surrounding the valve stem 19 and in the upper part of member 11 between the seats 43 and 44. Valve 59 controls the evacuation of gas from said chamber 64 to the header 51.

The mode of operation of the valve illustrated and described will now be explained. Referring to Fig. 1, the valve is shown in the valve open position with the valve heads 14 and 15 drawn toward each other by the tension of the springs 25. The skirt faces 28 of the valve heads are in contact with the annular faces 29 of member 11, thereby providing a composite body of substantially streamline configuration centrally spaced in the valve casing. When the valve is in the open position shown in Fig. 1, valves 55, 56, and 57 are closed and valve 54 is opened. Inlet valve 52 is then opened to admit sealing gas under pressure from the supply header 50 to nipple 60 and passage 61 and into the space between bellows 40 and 41. When the gauge indicates a suitable pressure, the valve 52 is closed. The gauge 53 is now in communication with the bellows seal chamber and serves as indicating means to show if there is any leakage of fluids to or from the valve casing along the valve stem 19 to the bellows seal 41. The upper end of the valve stem 19 is sealed by the cap 49 secured to the sleeve 32.

When it is desired to close the passage through the valve casing, valve 54 is closed and valve 57 is opened to evacuate sealing gas from between the bellows 40 and 41. Then the handwheel 36 is turned in the supporting yoke 37 to rotate the threaded sleeve 35, which in turn moves the sleeve 32 axially downward. The sleeve 32 is prevented from turning by means of the projections 47 on its collar 39 which engage vertical slots 48 in the fixed yoke 37. When sleeve 32 moves axially downward from the position shown in Fig. 1, it also moves the spindle 31 threaded thereto and the valve stem 19. Downward movement of the stem 19 causes the cam 20 to push the valve heads 14 and 15 apart through plungers 22 and the equalizing springs 23 until the seating material 16 of each valve head 14 and 15 engages the restricted portions of couplings 12 and 13 to effectively close the passage through the valve casing 10 at two points. When the valve is thus closed, as indicated in Fig. 3, fluid sealing is accomplished by closing valves 54, 56, and 58, and opening valves 52 and 55 to build up a suitable pressure of sealing gas in the internal space in member 11 between the valve heads 14 and 15. This pressure should be about equal to the maximum pressure effective on the outer face of either valve head 14 or 15 in order to prevent the leakage of fluids by either head. As before the gauge 53 serves as a means to indicate changes in pressure and hence to indicate leakage of fluids into the space between valve heads, or the leakage of sealing fluid from said space. The valve heads 14 and 15 may be opened by a reverse movement of hand wheel 36 to lift the valve stem 19 and cam 20, permitting the springs 25 to draw the valve heads 14 and 15 toward each other and away from seating contact with the coupling sleeves 12 and 13, respectively. Before the main valve is thus opened, it is desirable to close valve 55 and open valve 58 to permit the sealing gas within the main valve to be evacuated to the header 51. This will avoid undue contamination of the fluids controlled by the main valve heads 14 and 15. As the main valve heads are opened, sealing fluid may be admitted again to the space between bellows 40 and 41 to seal the stem 19.

When the gauge 53 indicates that there is leakage into or from the space between the bellows 40 and 41, the bellows assembly may be removed for repairs and replaced without taking the main valves out of service. An emergency sealing device to permit bellows repairs is provided in the form of temporary means to seal the valve stem 19 against leakage in either the valve open or valve closed position. To seal the valve stem with the valve open, the stem 19 is raised by hand wheel 36 to its uppermost position (Fig. 1) in which the stem projection 45 is seated against the tapered seat 43. The cap 49 is then removed and the spindle 31 screwed down on the valve stem 19 until the tapered end 46 of the spindle 31 seats on the tapered seat 44. Valves 54 and 55 are closed and valve 56 is opened to admit sealing gas to an annular chamber 64 surrounding the stem 19. The bellows assembly may now be removed for repairs or replacement. When the bellows seal assembly is again in place ready for use, the sealing gas in chamber 64 may be evacuated by closing valve 56 and opening valve 59. The spindle 31 is then returned to its original position with respect to stem 19 and the cap 49 replaced on the top of sleeve 35.

The valve construction shown and described is packless in that there are no moving parts between which it is necessary to use compressed packing in order to prevent the leakage of corrosive fluids from within the casing to the outside thereof. The sliding joint between the valve stem 19 and the casing member 11 is effectively sealed without packing by the use of the double bellows seal assembly 40 and 41 and the cap 49. The use of a sealing gas under pressure between the bellows 40 and 41 provides means by which leakage may be quickly detected. The use of sealing gas within the valve casing between the valve heads 14 and 15 when closed aids in preventing leakage by the valve heads 14 and 15, and provides means for detecting such leakage. The use of sealing gas along the valve stem 19 in chamber 64 provides an effective emergency seal to permit repairs to be made to the bellows type seals 40 and 41.

Numerous variations and modifications of structure described will be readily apparent to those skilled in the art and such variations and modifications may be made without departing from the spirit and scope of my invention as defined in the appended claims.

I claim:

1. A valve comprising in combination a casing having a passage therethrough, a pair of valve heads engageable with said casing to close said passage, said heads and said casing forming a closed chamber in valve closed position, a valve stem through said casing operable to engage said heads with said casing, means forming a closed chamber about said stem exteriorly of said casing, means for conveying a sealing fluid selectively to said closed chambers, and indicating means for indicating the pressure in said conveying means and the selected chamber.

2. A valve comprising in combination a casing having a passage therethrough, a pair of valve heads engageable with said casing to close said passage, said heads and said casing forming a closed chamber in valve closed position, a valve stem through said casing operable to engage said heads with said casing, means for sealing said stem comprising a bellows member sealed with respect to the stem and casing to form a closed chamber, sealing fluid conveying means interconnected to both of said closed chambers, means associated with said conveying means for selectively directing sealing fluid to said chambers, and indicating means for indicating the pressure in said conveying means and the selected chamber.

3. A valve comprising in combination a casing having a passage therethrough, a pair of valve heads engageable with said casing to close said passage, said heads and said casing forming a closed chamber in valve closed position, a member between said heads upon which said heads are movably mounted, a stem extending into said member operable to actuate said valve heads and having an annular inclined surface adapted to be seated against a cooperatively arranged annular inclined surface of said member when in valve open position, a bellows member sealed with respect to the stem and casing to form a closed chamber, sealing fluid conveying means interconnected to said closed chambers, means associated with said conveying means for selectively directing sealing fluid to said chambers, and indicating means for indicating the pressure in said conveying means and the selected chamber.

4. A valve comprising in combination a casing having a passage therethrough, a pair of valve heads engageable with said casing to close said passage, said heads and said casing forming a closed chamber in valve closed position, a member between said heads upon which said heads are movably mounted, said member having a pair of annular inclined surfaces for respective engagement with a cooperating inclined surface on each of said valve heads when in valve open position, a stem extending into said member between said heads for moving said heads into engagement with said casing, a bellows member sealed with respect to the casing and stem to provide a closed chamber, sealing fluid conveying means interconnected to said closed chambers, means associated with said conveying means for selectively directing sealing fluid to said chambers, and indicating means for indicating the pressure in said conveying means and the selected chamber.

5. A valve comprising in combination a casing having a passage therethrough, a pair of valve heads engageable with said casing to close said passage, said heads and said casing forming a closed chamber in valve closed position, a member at least a portion of which is positioned between said heads upon which said heads are movably mounted, a stem extending into said member for actuating said valve heads and having a pair of annular inclined surfaces adapted to be seated against a pair of cooperatively arranged inclined surfaces of said member, two of said cooperating surfaces being engaged in open valve position and the other two cooperating surfaces being engaged in closed valve position, a bellows member sealed with respect to the casing and stem to provide a closed chamber, sealing fluid conveying means interconnected to said closed chambers, means associated with said conveying means for selectively directing sealing fluid to said chambers, and indicating means for indicating the pressure in said conveying means and the selected chamber.

JESSE B. THOMAS.

REFERENCES CITED

The following references are of record in the file of this patent:

UNITED STATES PATENTS

| Number | Name | Date |
| --- | --- | --- |
| 1,182,737 | Bartz | May 9, 1916 |
| 1,284,833 | Walsh | Nov. 12, 1918 |
| 1,387,446 | Astier | Aug. 16, 1921 |
| 1,485,792 | McKay | Mar. 4, 1924 |
| 1,572,922 | Govers | Feb. 16, 1926 |
| 1,636,661 | Larner | July 19, 1927 |
| 1,826,941 | LaMont | Oct. 13, 1931 |
| 2,200,310 | Thayer | May 14, 1940 |

FOREIGN PATENTS

| Number | Country | Date |
| --- | --- | --- |
| 8,985 | Great Britain | 1899 |